United States Patent
Satish et al.

(10) Patent No.: US 7,950,056 B1
(45) Date of Patent: May 24, 2011

(54) BEHAVIOR BASED PROCESSING OF A NEW VERSION OR VARIANT OF A PREVIOUSLY CHARACTERIZED PROGRAM

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 906 days.

(21) Appl. No.: 11/480,315

(22) Filed: Jun. 30, 2006

(51) Int. Cl.
- *G06F 7/04* (2006.01)
- *G06F 11/00* (2006.01)
- *G06F 12/14* (2006.01)
- *G08B 23/00* (2006.01)

(52) U.S. Cl. ............ 726/22; 726/1; 726/2; 726/3; 726/4; 726/23; 726/24; 709/223; 709/224; 709/225

(58) Field of Classification Search ............... 726/21–25, 726/1–4; 713/153, 154, 164, 166, 188; 717/168–178; 709/223–225
See application file for complete search history.

(56) References Cited

U.S. PATENT DOCUMENTS

| | | | |
|---|---|---|---|
| 2002/0178375 A1* | 11/2002 | Whittaker et al. | 713/200 |
| 2004/0117624 A1* | 6/2004 | Brandt et al. | 713/166 |
| 2004/0143749 A1* | 7/2004 | Tajalli et al. | 713/200 |
| 2004/0168085 A1* | 8/2004 | Omote et al. | 713/201 |
| 2005/0086500 A1* | 4/2005 | Albornoz | 713/188 |
| 2007/0113270 A1* | 5/2007 | Kraemer et al. | 726/4 |

OTHER PUBLICATIONS

U.S. Appl. No. 11/393,444, filed Mar. 29, 2006, Satish et al.
U.S. Appl. No. 11/394,524, filed Mar. 31, 2006, Satish et al.

* cited by examiner

*Primary Examiner* — Thanhnga B Truong
*Assistant Examiner* — Madhuri Herzog
(74) *Attorney, Agent, or Firm* — Hunton & Williams, LLP

(57) ABSTRACT

Behavior based processing of a new version or variant of a previously characterized program is disclosed. An indication is received that a process with respect to which a trust decision was made previously has undergone a change. The process is allowed to continue to engage, after the change, in a network behavior associated with the process prior to the change, without first prompting a user, subsequent to the change, to provide an input indicating whether the changed process is to be allowed to engage in the network behavior subsequent to the change.

18 Claims, 3 Drawing Sheets

BEHAVIOR BASED PROCESSING OF A NEW VERSION OR VARIANT OF A PREVIOUSLY CHARACTERIZED PROGRAM

BACKGROUND OF THE INVENTION

Host based and other firewalls have been provided to monitor and control outbound network communications from a protected host. Typically, such firewalls are configured to whether the process that initiated an outbound network communication is trusted, either generally or to make the specific communication in question. A common approach is to prompt a user, for example the first time a particular process attempts to communicate via the network, to indicate the extent to which the user wants to permit the requesting process (or, for example, an underlying application or process with which the requesting process is associated) to perform the requested communication and/or other outbound communications. In some cases, the firewall may be configured to allow or block outbound network communication from a particular process without such user interaction, e.g., by "white listing" applications included in a standard approved configuration or "blacklisting" applications and/or other process considered untrustworthy. Depending on the firewall and/or configuration, a process may be indicated by a user to be trusted to perform the particular action(s) it has attempted and/or performed in the past or to perform any outbound network communication.

Typically, to prevent an attacker from taking advantage of a prior decision to trust a particular application or other process by replacing and/or augmenting the trusted code with malicious code, an application or other process is considered to be the same as one previously determined to be trusted only if the name and path match and the associated binary code is identical, as determined for example by a hash or other value computed based at least in part on the binary code. If the binary code is not identical, typically the application or other process is no longer considered to be trusted, even if the name and path are the same as an application or other process determined previously to be trusted. However, the binary code of a trusted application or other process may undergo authorized changes, e.g., a new patch or update, or even a new version with no or only few changes that implicate security concerns (e.g., new network behavior, such as contacting a new server). Under current approaches, a user who installs a patch or update, or a new version of a trusted application, is prompted the first time an application attempts to communicate via the Internet after a patch, update, or new version has been installed, even though the user has previously indicated the application is trusted, which can be a nuisance to users.

Therefore, there is a need for a better way to process network communications by new versions/variants of a previously characterized (e.g., trusted) application or other process.

BRIEF DESCRIPTION OF THE DRAWINGS

Various embodiments of the invention are disclosed in the following detailed description and the accompanying drawings.

DETAILED DESCRIPTION

Figure 1:
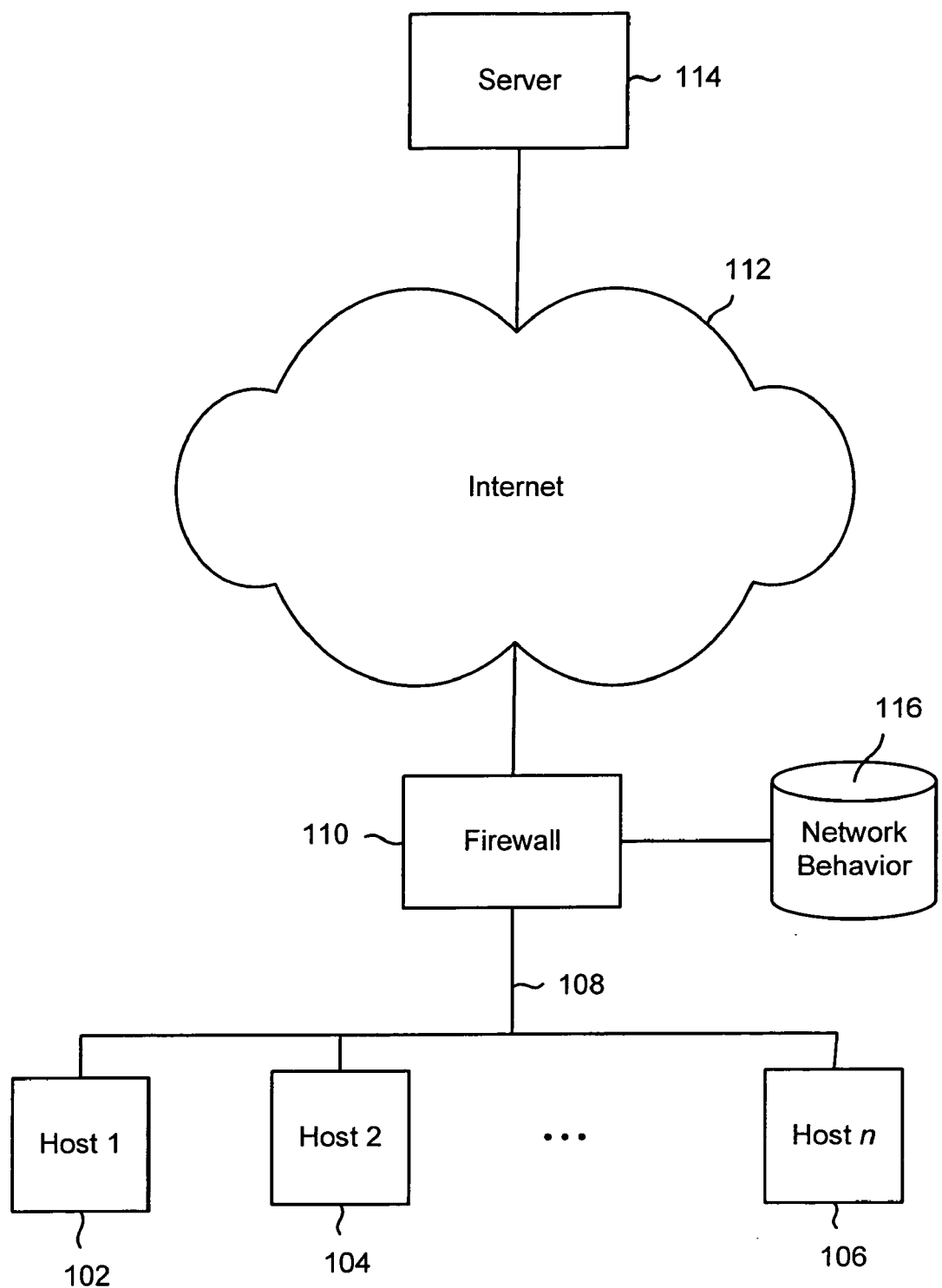
FIG. 1 is a block diagram illustrating an embodiment of a system for behavior based processing of a new version or variant of a previously characterized application or other process.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Continuing to afford a previously-determined level of trust to an application or other process that has been changed subsequent to the previously-determined level of trust being determined, at least to the extent the behavior of the changed application or other process does not depart from a baseline of behavior the application was observed, known, and/or permitted to engage in prior to being changed, is disclosed. In some embodiments, once an indication has been provided, e.g., through a user interaction or otherwise, of an extent to which an application or other process is trusted to engage in certain regulated behavior, e.g., outbound network communications, the application or other process is trusted to continue to engage in previously observed, known, and/or permitted behavior even subsequent to the binary code of the application or other process being changed. If the changed application or other process engages in a new behavior, a user is prompted to indicate whether the application or other process is to be trusted to engage in the new behavior. In various embodiments, an administrator and/or other user is prompted to indicate an extent to which the changed application or other process is to be trusted, for example to permit or block just the specific new behavior that is being attempted, to permit or block all new behaviors (or a subset thereof), or to block all relevant behavior (e.g., all network communications, including ones allowed previously).

FIG. 1 is a block diagram illustrating an embodiment of a system for behavior based processing of a new version or variant of a previously characterized application or other process. A plurality of internal hosts 1 to n, represented in FIG. 1 by hosts 102, 104, and 106, have access via an internal network 108 and a firewall 110 to the Internet 112. Hosts 102-106 are configured to communicate with external hosts accessible via the Internet 112, such as the external server 114 shown in FIG. 1. For example, one or more of hosts 102-106 may download from server 114 an application or other code, or an update, security or other patch, upgrade, or other new version of a previously installed application or other code. Or, an application or other process running on one or more of hosts 102-106 may communicate with server 114 in the course of executing, e.g., to retrieve webpage, multimedia, and/or other content; provide instant messaging and/or other communication functionality; obtain news or other information; post cost content to an external website or other external destination; check for and/or download updated data, such as virus or other threat definitions; etc. In the example shown, a database of observed, known, and/or otherwise characterized network behavior of one or more applications and/or other processes installed on one or more of internal hosts 1 to n is maintained in a network behavior database 116 connected to and associated with firewall 110.

In some embodiments, firewall 110 and/or an intrusion prevention or detection or other security system (not shown) is configured to monitor and control centrally outbound network communications, based on a set of rules (not shown) maintained at the firewall 110. Network behaviors of trusted applications and/or other processes are observed and recorded in network behavior database 116. In some embodiments, network behaviors observed or otherwise learned by an external source are downloaded from the external source and stored in network behavior database 116. In some embodiments, network behaviors associated with widely distributed and/or used applications and/or other processes are obtained from an external source but network behaviors for less widely used applications and/or other processes are learned locally through local observation of the network behavior of such applications and/or other processes. If binary code associated with an application or other process changes, the changed application or process is permitted to engage in network behaviors that were observed, known, or otherwise determined to be permissible previously, as indicated in the records/information stored in network behavior database 116. If the binary code associated with a previously characterized application or other process has changed (i.e., the binary has changed but the name and/or path by which the application is identified has not changed, the signature/other credential is the same, etc., in some embodiments the firewall 110 is configured to continue to trust the changed application or other process to engage in previously observed, known, and/or otherwise permitted network behaviors. If a previously characterized but subsequently changed application or process attempts a new behavior—e.g., new name resolution/DNS query; talking to a new server or other remote host; using a new port or protocol; communicating over a previously known port/protocol and/or with a previously known remote host, but in a different direction; etc.—an administrator or other user is prompted to provide an indication as to the extent to which the changed application or other process is to be trusted to engage in the new behavior and/or new and/or old behaviors generally.

In some embodiments, the network behavior database 116 is connected to and accessible by internal hosts 1 to n directly via the internal network 108. In addition to or instead of outbound network communications being regulated by firewall 110, a host based outbound communication firewall is installed on each of one or more of internal hosts 1 to n. The host based firewall observes network behavior of trusted applications and processes and reports same to a central repository maintained at the network behavior database 116. This approach relieves the individual hosts from the task of maintaining at the host a complete database of network behaviors and enables each host to learn from the behaviors observed by other hosts.

Figure 2:
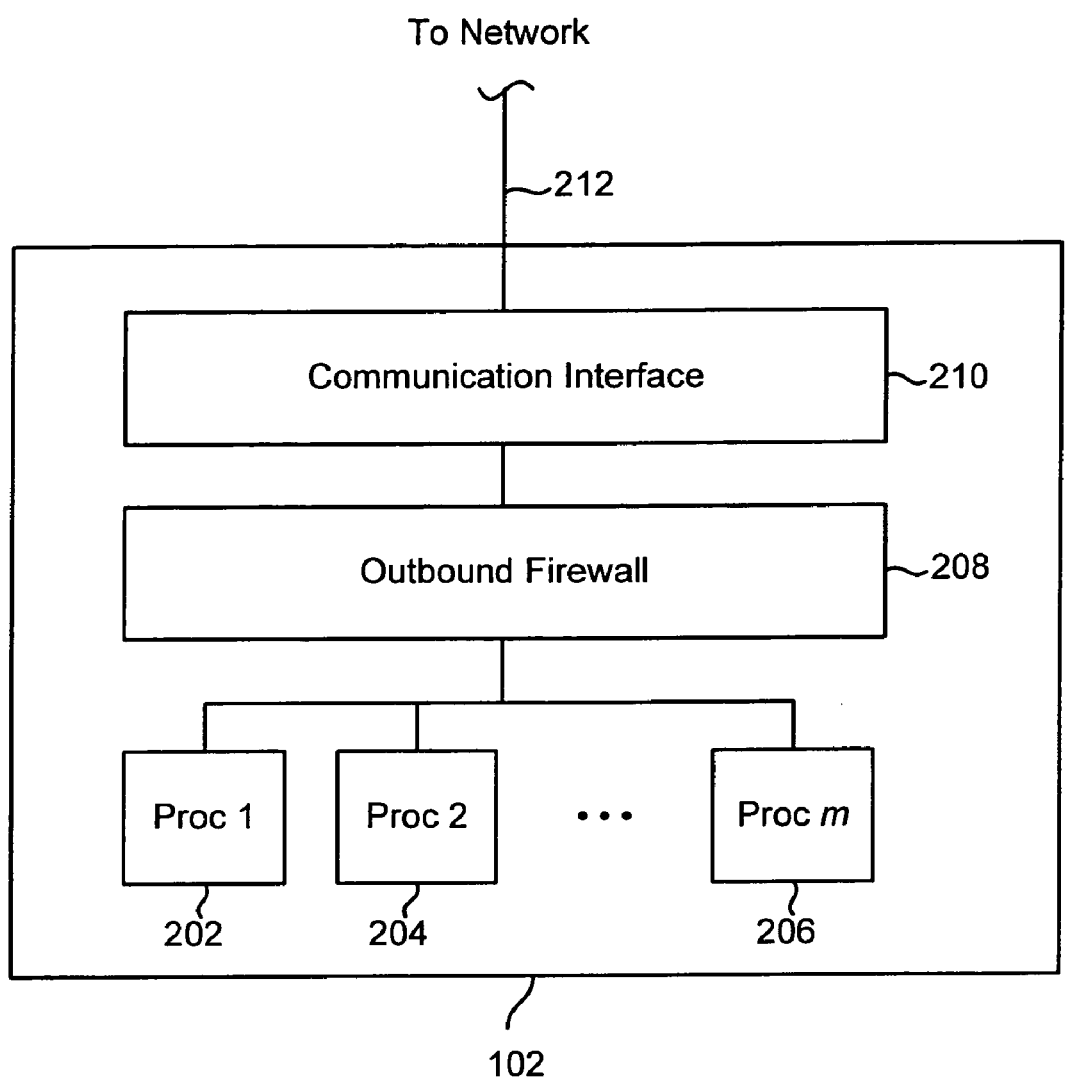
FIG. 2 is a block diagram illustrating an embodiment of a system for behavior based processing of a new version or variant of a previously characterized application or other process.

FIG. 2 is a block diagram illustrating an embodiment of a system for behavior based processing of a new version or variant of a previously characterized application or other process. In the example shown, internal host 102 has installed and/or running on it a plurality of processes 1 to m, represented in FIG. 2 by processes 202, 204, and 206. Each of the processes 1 to m has access via a host based outbound communication firewall 208 to a network communication interface 210. Communication interface 210 in various embodiments comprises a network interface card (NIC) and/or other network interface. In the example shown, communication interface 210 provides access via a network cable 212 to an internal network, such as network 108. Outbound communication firewall 208 is configured to monitor and control outbound communications made and/or attempted to be made by processes 1 to m to remote hosts via the Internet. As described above, in some embodiments host based outbound communication firewall 208 is configured to continue to trust a previously characterized application or other process to the extent the application or other process engages in network behaviors observed and/or otherwise known to be associated with the application or other process prior to the change to its binary code. If the changed application or other process attempts a new behavior, an administrator or other user is prompted to provide an indication as to the extent to which the changed application or other process is to be trusted. In some embodiments, outbound communication firewall 208 may communicate with a source of information external to host 102 to determine whether a network behavior attempted by a changed application or other process is a behavior that was observed, known, and/or otherwise permitted with respect to the application or process prior to the change.

Figure 3:
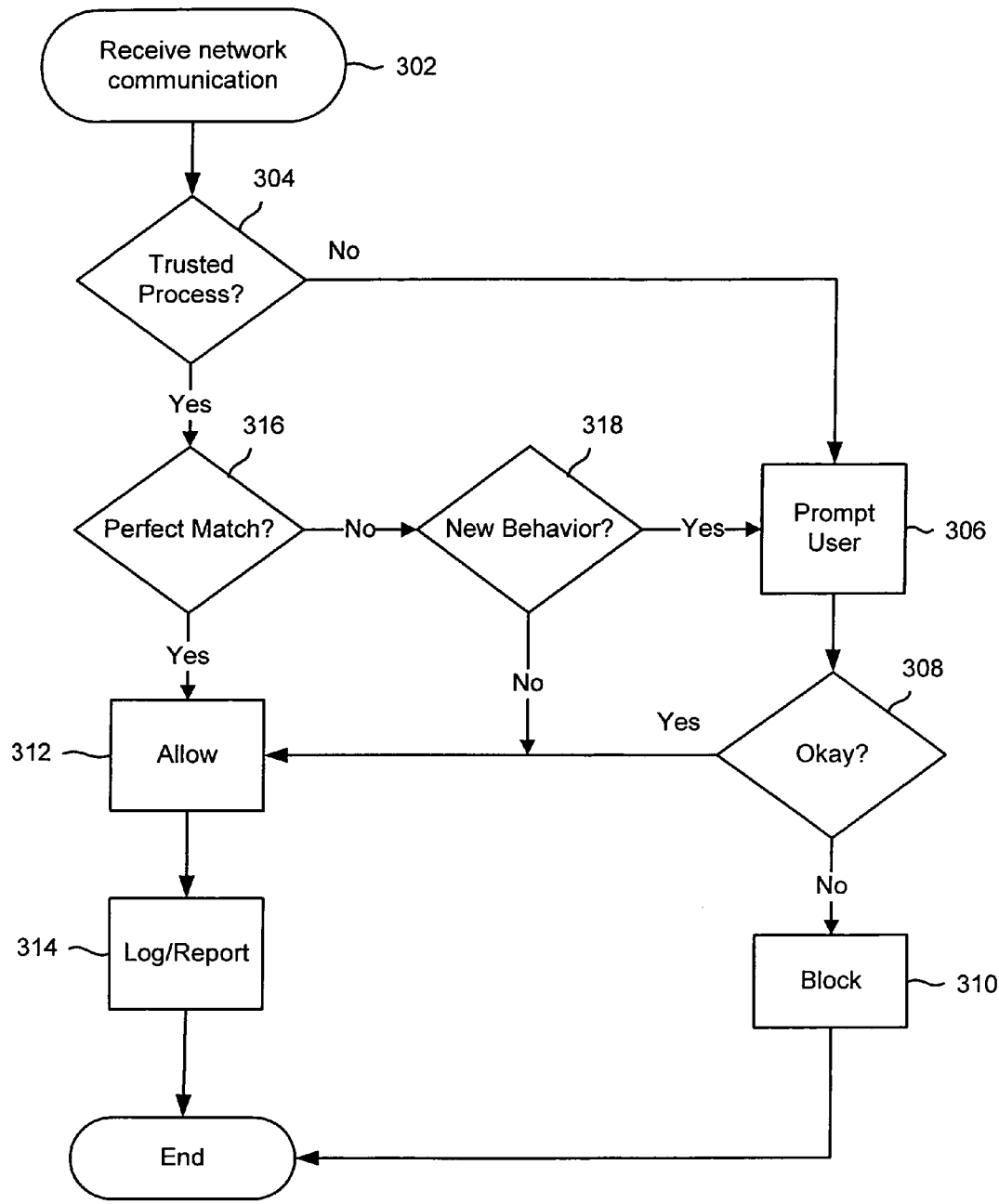
FIG. 3 is a flow chart illustrating an embodiment of a process for behavior based processing of a new version or variant of a previously characterized application or other process.

FIG. 3 is a flow chart illustrating an embodiment of a process for behavior based processing of a new version or variant of a previously characterized application or other process. In some embodiments, the process of FIG. 3 is implemented by a firewall, gateway, intrusion prevention system, intrusion detection system, or other security system or application configured to monitor and/or control outbound network communications from a node other than the host that originated the communication. In some embodiments, the process of FIG. 3 is implemented by a host based outbound communication firewall, such as outbound communication firewall 208 of FIG. 2. Each time an outbound (external) network communication is received (302), it is determined whether it was initiated by a trusted process (304). In some embodiments, a communication is determined to have been initiated by a trusted process if the process name, path, and in some embodiments signature or other authentication information matches exactly the corresponding information for a process characterized (e.g., determined to be trusted) previously. If the communication was initiated by a process not previously determined to be trusted (304), an administrator and/or other user (e.g., a user of the host at which the communication originated) is prompted (306) to provide an indication of the extent to which the previously unknown process is to be trusted to communicate via the network. In various embodiments, the user may indicate the process is to be trusted to engage in the specific behavior attempted, a class of behavior, or external communications generally, or that the process should be blocked from engaging in the specific behavior attempted, an associated class of behavior, and/or all external network communications. If the user indicates the process should be prevented from performing the attempted behavior (308), the communication is blocked (310) and processing of the communication ends. In some embodiments, an alert or other notification is sent to an administrator and/or an event is logged if a user indicates a process should be blocked from engaging in a network behavior. In some embodiments, a decision that a process is not trusted to perform a network behavior it has attempted, a class of behaviors, or external network communications generally is recorded and future attempts by the same process to engage in the proscribed behavior(s) are blocked without prompting any user for input. If the user indicates the process should be trusted to perform the attempted behavior, a related class of behavior, or external network communications generally (308), the outbound network communication is allowed (e.g., forwarded to a communication interface for processing and transmission) (312) and the behavior is logged locally and/or reported to an external repository (314), to be included in a body of information concerning the observed and/or otherwise known network behavior of the process.

If the network communication received at 302 was initiated by a process determined previously to be trusted (304), e.g., the name, path, and/or signature or other credential match that of the process with respect to which the previous trust decision was made, it is determined whether the binary code associated with the process is a perfect match with the previously-characterized process (316). If the binary code has not changed (316), the behavior is allowed (312) and logged/reported (314), after which the process ends. If the binary code has changed (316), it is determined whether the network communication received at 302 is associated with a new network behavior (318). If the communication received at 302 is determined to be associated with a behavior that is not new, i.e., it is a behavior observed and/or otherwise known to be associated with the process prior to the change to its code (318), the behavior is allowed (312) and logged/reported (314), after which the process ends. If the communication received at 302 is associated with a new behavior (318), an administrator and/or other user (e.g., of the host at which the communication was originated) is prompted (306) to provide an indication of the extent to which the previously characterized but subsequently changed process is to be trusted to engage in the new behavior, a class of behaviors that includes the new behavior, any/all new behaviors, only old behavior, and/or no external network communications, depending on the embodiment, configuration, and/or circumstances.

The approaches described herein facilitate efficient and user-friendly security processing of a new version or variant of a previously characterized application or other process. While the techniques are applied in the examples described in detail above to outbound external network behaviors, the approaches described herein may be applied to any behavior or set of behaviors that have security implications.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing computer security, comprising:
determining whether a network communication is from a trusted process based at least in part on identification data associated with the trusted process;
determining, in the event that the network communication is from the trusted process, that the trusted process has undergone a change to a binary code associated with the trusted process;
allowing the trusted process to continue to engage in a network behavior subsequent to the change that the trusted process engaged in prior to the change, without first prompting a user to provide an input indicating whether the trusted process should be allowed to continue to engage in the network behavior subsequent to the change based at least in part on information stored in a network behavior repository;
receiving, subsequent to the change, an attempt by the trusted process to engage in a new network behavior that was not associated with the trusted process prior to the change;
prompting, based on the received attempt, a user to provide an indication whether the trusted process is to be allowed to engage in the new network behavior, wherein the prompt allows a user to specify options indicating an extent to which the trusted process is to be allowed to engage in the new network behavior, wherein the options include a type of network behavior that includes the new network behavior, wherein the user is not prompted if a change to the binary code associated with the trusted process has not been detected;
denying engagement in the new network behavior, in the event that an indication to deny engagement in the new network behavior is received from the user, while allowing the trusted process to continue; and
logging the new network behavior, in the event that an indication to allow engagement in the new network behavior is received, to include the logged information in the network behavior repository;
wherein the type of network behavior comprises communicating via a port over which the trusted process was not observed to communicate prior to the change, communicating using a protocol by which the trusted process was not observed to communicate prior to the change, and communicating with a remote host with which the trusted process was observed to communicate prior to the change but in a different direction than the previously observed communication.

2. The method as recited in claim 1, wherein the trusted process is continued to be allowed to engage in the network behavior associated with the trusted process prior to the change only if identification data associated with the trusted process has not changed.

3. The method as recited in claim 2, wherein the identification data comprises one or more of the following: a process name, a path, and a security credential.

4. The method as recited in claim 1, wherein the options further include one or more of the following: the new network behavior; any network behavior; and no network behavior.

5. The method as recited in claim 1, wherein the type of network behavior further comprises a new name resolution/DNS query and a communication to a server or other remote host with which the trusted process was not observed to communicate prior to the change.

6. The method as recited in claim 1, wherein the network behavior comprises an outbound network communication.

7. The method as recited in claim 1, wherein the network behavior comprises one or more of the following: a previously observed name resolution/DNS query; a communication to a server or other remote host with which the trusted process was observed to communicate prior to the change; communicating via a port over which the trusted process was observed to communicate prior to the change; communicating using a protocol by which the trusted process was observed to communicate prior to the change; and communicating with a remote host with which the trusted process was observed to communicate prior to the change and in the same direction as the previously observed communication.

8. The method as recited in claim 1, further comprising determining that the network behavior was associated with the trusted process prior to the change.

9. The method as recited in claim 1, further comprising observing the trusted process to engage in the network behavior prior to the change.

10. The method as recited in claim 1, further comprising storing, prior to the change, data associating the network behavior with the trusted process.

11. The method as recited in claim 1, further comprising reporting to an external repository prior to the change data associating the network behavior with the trusted process.

12. The method as recited in claim 1, further comprising receiving from an external source data indicating that the network behavior was associated with the trusted process prior to the change.

13. A system configured to provide computer security, comprising:
  a communication interface; and
  a processor coupled to the communication interface and configured to:
    determine whether a network communication is from a trusted process based at least in part on identification data associated with the trusted process;
    determine, in the event that the network communication is from the trusted process, that the trusted process has undergone a change to a binary code associated with the trusted process;
    allow the trusted process to continue to engage in a network behavior subsequent to the change that the trusted process engaged in prior to the change, without first prompting a user to provide an input indicating whether the trusted process should be allowed to continue to engage in the network behavior subsequent to the change based at least in part on information stored in a network behavior repository;
    receive, subsequent to the change, an attempt by the trusted process to engage in a new network behavior that was not associated with the trusted process prior to the change;
    prompt, based on the received attempt, a user to provide an indication whether the trusted process is to be allowed to engage in the new network behavior, wherein the prompt allows a user to specify options indicating an extent to which the trusted process is to be allowed to engage in the new network behavior, wherein the options include a type of network behavior that includes the new network behavior, wherein the user is not prompted if a change to the binary code associated with the trusted process has not been detected;
    deny engagement in the new network behavior, in the event that an indication to deny engagement in the new network behavior is received from the user, while allowing the trusted process to continue; and
    log the new network behavior, in the event that an indication to allow engagement in the new network behavior is received, to include the logged information in the network behavior repository;
    wherein the type of network behavior comprises communicating via a port over which the trusted process was not observed to communicate prior to the change, communicating using a protocol by which the trusted process was not observed to communicate prior to the change, and communicating with a remote host with which the trusted process was observed to communicate prior to the change but in a different direction than the previously observed communication.

14. The system as recited in claim 13, wherein the network behavior comprises communicating via the communication interface.

15. The system as recited in claim 13, wherein the system comprises a host on which the trusted process is running.

16. The system as recited in claim 13, wherein the system comprises a node other than a host on which the trusted process is running.

17. A non-transitory computer readable storage medium having embodied thereon computer instructions which when executed by a computer cause the computer to perform a method comprising:
  determining whether a network communication is from a trusted process based at least in part on identification data associated with the trusted process;
  determining, in the event that the network communication is from the trusted process, that the trusted process has undergone a change to a binary code associated with the trusted process;
  allowing the trusted process to engage in a network behavior subsequent to the change that the trusted process engaged in prior to the change, without first prompting a user to provide an input indicating whether the trusted process should be allowed to continue to engage in the network behavior subsequent to the change based at least in part on information stored in a network behavior repository;
  receiving, subsequent to the change, an attempt by the trusted process to engage in a new network behavior that was not associated with the trusted process prior to the change; and
  prompting, based on the received attempt, a user to provide an indication whether the trusted process is to be allowed to engage in the new network behavior, wherein the prompt allows a user to specify options indicating an extent to which the trusted process is to be allowed to engage in the new network behavior, wherein the options include a type of network behavior that includes the new network behavior, wherein the user is not prompted if a change to the binary code associated with the trusted process has not been detected;
  denying engagement in the new network behavior, in the event that an indication to deny engagement in the new network behavior is received from the user, while allowing the trusted process to continue; and
  logging the new network behavior, in the event that an indication to allow engagement in the new network behavior is received, to include the logged information in the network behavior repository;
  wherein the type of network behavior comprises communicating via a port over which the trusted process was not observed to communicate prior to the change, communicating using a protocol by which the trusted process was not observed to communicate prior to the change, and communicating with a remote host with which the trusted process was observed to communicate prior to the change but in a different direction than the previously observed communication.

18. The non-transitory computer readable storage medium as recited in claim 17, wherein the computer readable storage medium comprises a host based outbound firewall.

* * * * *